United States Patent
Aoki et al.

(10) Patent No.: US 7,630,804 B2
(45) Date of Patent: Dec. 8, 2009

(54) OCCUPANT INFORMATION DETECTION SYSTEM, OCCUPANT RESTRAINT SYSTEM, AND VEHICLE

(75) Inventors: Hiroshi Aoki, Tokyo (JP); Masato Yokoo, Tokyo (JP); Yuu Hakomori, Tokyo (JP)

(73) Assignee: Takata Corporation, Tokyo (JP)

( * ) Notice: Subject to any disclaimer, the term of this patent is extended or adjusted under 35 U.S.C. 154(b) by 371 days.

(21) Appl. No.: 11/458,505

(22) Filed: Jul. 19, 2006

(65) Prior Publication Data

US 2008/0021616 A1  Jan. 24, 2008

(30) Foreign Application Priority Data

Jul. 19, 2005  (JP) ............................... 2005-208990

(51) Int. Cl.
*B60R 22/00* (2006.01)
(52) U.S. Cl. .................... 701/45; 180/271; 340/576; 340/573.1
(58) Field of Classification Search .................. 701/45, 701/46; 180/271; 382/140, 154; 340/576, 340/573.1, 575
See application file for complete search history.

(56) References Cited

U.S. PATENT DOCUMENTS

| | | | | |
|---|---|---|---|---|
| 5,983,147 | A | | 11/1999 | Krumm |
| 6,027,138 | A | * | 2/2000 | Tanaka et al. ............... 280/735 |
| 6,029,105 | A | * | 2/2000 | Schweizer ................... 701/45 |
| 7,123,747 | B2 | * | 10/2006 | Wallace et al. .............. 382/104 |
| 7,295,123 | B2 | * | 11/2007 | Engelberg et al. ........... 340/576 |
| 2003/0040859 | A1 | * | 2/2003 | Farmer ........................ 701/45 |
| 2003/0079929 | A1 | | 5/2003 | Takagi et al. |
| 2003/0125855 | A1 | | 7/2003 | Breed et al. |
| 2006/0138759 | A1 | | 6/2006 | Aoki et al. |

FOREIGN PATENT DOCUMENTS

| | | |
|---|---|---|
| JP | 2002-264747 | 9/2002 |
| WO | 98/48372 | 10/1998 |

OTHER PUBLICATIONS

A search report dated May 23, 2007, from the European Patent Office in corresponding European Application No. 06014047.2-1523.

* cited by examiner

*Primary Examiner*—Mark Hellner
(74) *Attorney, Agent, or Firm*—Fitch, Even, Tabin & Flannery (57) ABSTRACT

A technology is provided which is effective for precisely detecting information about a vehicle occupant in a vehicle seat. In one form, an occupant restraint system to be installed in a vehicle is adapted to associate occupant surface profile information relating to a specific body region of a vehicle occupant, which is obtained by a camera for obtaining an image relating to a single view point, with previously stored body information so as to derive body information about the vehicle occupant and varies the occupant restraining mode of an occupant restraint device according to the derived body information.

15 Claims, 7 Drawing Sheets

OCCUPANT INFORMATION DETECTION SYSTEM, OCCUPANT RESTRAINT SYSTEM, AND VEHICLE

FIELD OF THE INVENTION

The present invention relates to a technology for developing an occupant information detection system to be installed in a vehicle.

BACKGROUND OF THE INVENTION

Conventionally, an occupant restraint device is known which restrains a vehicle occupant by an air bag or the like in the event of vehicle collision. For example, disclosed in Japanese Patent Unexamined Publication No. 2002-264747 is a structure in which a camera for photographing a vehicle occupant or the like is used as an occupant's state estimating device for estimating the state of an occupant and then an occupant restraint device such as an airbag is controlled based on the state of the occupant estimated by the occupant's state estimating device.

In an occupant restraint device of the aforementioned type for restraining an occupant in the event of a vehicle collision, a technology for obtaining precise information such as the posture and/or the body size of a vehicle occupant in a vehicle seat by using cameras is highly demanded. For example, with regard to the body size of vehicle occupant, there may be a difference between the fact and appearance due to the thickness of clothing and the like. Under this circumstance, it is required to know the actual body size of the vehicle occupant precisely. However, though the aforementioned patent document discloses the idea of estimating the state of the occupant by using a detection device, there is no description about concrete arrangement effective for grasping the posture, the body size, and the like of the vehicle occupant precisely.

SUMMARY OF THE INVENTION

The present invention has been made in view of the above problem and it is an object of the present invention to provide an effective technology for detecting information about a vehicle occupant in a vehicle seat precisely.

For achieving the object, the present invention is configured. Though the present invention is typically adapted to an occupant information detection system for detecting information about a vehicle occupant in a vehicle seat in an automobile, the present invention can be also adapted to a technology for developing an occupant information detection system for detecting information about a vehicle occupant in a vehicle seat of a vehicle other than the automobile. The "vehicle" used here includes various vehicles such as automobile, airplane, boat, train, bus, truck, and the like.

The first form of the present invention for achieving the aforementioned object is an occupant information detection system as described hereafter.

The occupant information detection system in this form is a system for detecting information about a vehicle occupant in a vehicle seat and comprises at least a camera, an information extraction device, a storage device, and a deriving device. The "vehicle occupant" used here includes an occupant directly seated in the vehicle seat and an occupant indirectly seated in the vehicle seat via a child seat or a junior seat. In the present invention, the "information about a vehicle occupant" widely includes the body size of the vehicle occupant, the position of the vehicle occupant, the positions and configurations of respective body regions of the vehicle occupant, presence or absence of the vehicle occupant, and the like.

The camera of the present invention is a device for obtaining an image relating to a single view point directing to the vehicle occupant. As the camera capable of obtaining an image relating to a single view point, a monocular C-MOS 3D camera or a pantoscopic stereo 3D camera may be used.

The information extraction device of the present invention is a device for extracting information about surface profile of the vehicle occupant based on the image obtained by the camera. The information extraction device extracts (detects) presence or absence of surface profile (or contour) of the vehicle occupant and the position of the contour.

The storage device of the present invention is a device for previously storing body information about surface profiles of a human body. As the body information to be previously stored, contours and sizes of respective body regions composing a human body, and positional relations between the body regions may be employed. Preferably, gender-based data and age-based data are stored as the body information.

The deriving device is a device for deriving at least the position of a specific body region of the vehicle occupant by associating occupant surface profile information relating to the specific body region in the information extracted by the information extraction device with the body information which is previously stored in the storage device.

As the "specific body region" used here, one or more of body regions such as neck, head, face, jaw, shoulder, arm, leg, knee, and the like may be employed. In the present invention, the specific body region may be set previously, or it may be set on the spot according to the reliability of information extracted by the information extraction device.

The "occupant surface profile information relating to the specific body region" in the present invention includes information about a surface profile of the specific body region itself and surface profiles of regions around the specific body region. Therefore, the occupant surface profile information to be associated with the previously stored body information may be information about the surface profile of the specific region or the surface profile continuously formed with the plurality of regions.

In the present invention, the deriving device may be adapted to derive not only the position of the specific body region but also the body size of the vehicle occupant, the position of the vehicle occupant, the positions and configurations of respective body regions of the vehicle occupant, presence or absence of the vehicle occupant, and the like.

According to the arrangement of the occupant information detection system as described above, the occupant surface profile information relating to the specific body region of the vehicle occupant actually obtained by the camera is not used solely, but is associated with the previously stored body information about the occupant surface profiles so as to derive the position of the specific body region, thereby improving the detection reliability. Therefore, it is possible to detect information about the vehicle occupant in the vehicle seat precisely.

The information about the vehicle occupant detected by the occupant information detection system as described above can be preferably used for control of occupant restraint device, for example, an airbag apparatus and a seat belt apparatus for restricting the vehicle occupant, and a warning device (indication output, audio output). Since all that is required by the present invention is the installation of a single camera which is focused on the vehicle seat with regard to the "single view point", the present invention does not avoid the installation of another camera or another view point for another purpose.

The second form of the present invention for achieving the aforementioned object is an occupant information detection system as described hereafter.

In the occupant information detection system in this form, the deriving device as described earlier is adapted to compare the surface profile information of said specific body region to the body surface profile information of respective body regions which are previously stored in the storage device and derive the position of said specific body region based on a result of the comparison.

According to this arrangement, the position of the specific body region can be detected precisely by comparing the occupant surface profile information of the specific body region to the body surface profile information of the respective body regions which are previously stored in the storage device when deriving the position of the specific body region.

The third form of the present invention for achieving the aforementioned object is an occupant information detection system as described hereafter.

In the occupant information detection system in this form, the deriving device as described above is adapted to compare the positional relation between the specific body region and a region around the specific body region to the positional relation between body regions which are previously stored in the storage device in addition to comparing the surface profile information of the specific body region to the body surface profile information of respective body regions which are previously stored in the storage device, and derive the position of the specific body region based on a result of the comparison.

In deriving the position of the specific body region, when the body surface profile information of the respective body regions which is previously stored is similar to the surface profiles of a plurality of occupant surface profiles, there are a plurality of candidates as the specific body region. In this case, it is difficult to identify the specific body region. Therefore, in the present invention, the process makes not only a comparison for the surface profile (contour) of the specific body region itself but also a comparison relating to the positional relation between the specific body region and its peripheral regions. Specifically, in addition to the feature of the contour of the neck region, a condition that the neck is near the shoulders and the jaw is also employed. With this condition, the process makes a comparison with the body information which is previously stored, thereby precisely refining the candidate regions. Therefore, this arrangement allows more precise detection of the position of the specific body region.

The fourth form of the present invention for achieving the aforementioned object is an occupant information detection system as described hereafter.

In the occupant information detection system in this form, besides deriving the position of the specific body region, the deriving device as in any of the earlier described forms is adapted to derive information about the vehicle occupant based on the positional relation between the specific body region and a vehicle-side reference region. The "vehicle-side reference region" used here is a vehicle-side region having a position relative to the vehicle occupant. Examples of the vehicle-side reference region are a vehicle seat, an interior panel, a door, a ceiling panel, and a steering wheel. The position of the vehicle-side reference region may be detected at the same time of detection of the vehicle occupant by the camera or may be previously stored as a reference position.

According to this arrangement, information about the vehicle occupant (body size, position of the vehicle occupant, positions and configurations of respective body regions, presence or absence of the vehicle occupant, and the like) can be derived based on the positional relation between the specific body region and the vehicle reference region. The position of the specific body region is obtained with reference to the position of the vehicle-side reference region, thereby detecting the information about the vehicle occupant precisely.

The fifth form of the present invention for achieving the aforementioned object is an occupant information detection system as described hereafter.

In the occupant information detection system in this form, the deriving device as in any of the earlier described forms is adapted such that a neck region of a person is set as the specific body region.

Among the respective body regions, the neck region (contour around the neck) set as the specific body region has significant feature in surface profile. Further, its contour is hardly influenced by the slight shifting of the photographing direction of the camera and its level is hardly changed relative to the movement of the vehicle occupant. In addition, since the neck region is exposed from clothes or the like, the neck region is hardly influenced by the thickness of the clothes when it is required to detect the actual body size of the vehicle occupant. Therefore, among regions of the body, the neck region is a region especially effective to estimate the body size of the vehicle occupant precisely. This arrangement enables more precise detection of information about the vehicle occupant.

The sixth form of the present invention for achieving the aforementioned object is an occupant information detection system as described hereafter.

In the occupant information detection system in this form, the deriving device as in any of the earlier described forms is adapted such that the vehicle seat is set as the vehicle-side reference region.

The vehicle seat set as the vehicle-side reference region is a region closely relating to the position and movement of the vehicle occupant seated in the vehicle seat among respective vehicle-side regions and is especially effective as a reference for the position of the vehicle occupant. Therefore, according to the arrangement in which the vehicle seat is set as the vehicle-side reference region, information about the vehicle occupant can be detected more precisely.

The seventh form of the present invention for achieving the aforementioned object is an occupant information detection system as described hereafter.

In the occupant information detection system in this form, with regard to the association of the occupant surface profile information relating to the specific body region of the vehicle occupant with the body information which is previously stored in the storage device, the deriving device as in any of the earlier described forms has criterion for determination whether the association is valid or not. The degree of similarity between the occupant information actually obtained by the camera and the body information previously stored in the storage device or the degree of quality of image information actually obtained by the camera may be employed as the criterion for determination. Therefore, it is possible to screen out, for example, image information of which quality is decreased due to irregular posture and movement of the vehicle occupant or abnormal optical reflection. Accordingly, among a plurality of body regions, only a region having high similarity to the body information previously stored in the storage device or a region having high quality image information (region having high reliability as image information)

can be set as the specific body region. This arrangement can screen information about the vehicle occupant according to the reliability when detecting information about the vehicle occupant, thereby enabling use of only information having high reliability.

The eighth form of the present invention for achieving the aforementioned object is an occupant restraint system as described hereafter.

The occupant restraint system in this form comprises: at least an occupant information detection system as in any of the earlier described forms, a restraint device, and a control device.

The restraint device of this invention is a device to be actuated to restrain a vehicle occupant in the event of a vehicle collision. The "restraint device" used here includes occupant restraint devices such as an airbag apparatus (airbag module) and a seat belt apparatus.

The "control device" is a device for varying the mode for restraining the vehicle occupant by said restraint device according to information about the vehicle occupant derived by the deriving device. For example, operation (pressure, flow volume of gas, and the like) of an inflator as a gas generator for supplying gas for deploying an airbag in the event of a vehicle collision and/or operation (tension on a seat belt, winding amount and winding speed of the seat belt, and the like) of a pretensioner or a retractor for controlling the seat belt are controlled to be varied according to the information about the vehicle occupant (the body size of the vehicle occupant, the position of the vehicle occupant, the positions and configurations of respective body regions of the vehicle occupant, presence or absence of the vehicle occupant, and the like). The control device may be provided exclusively for the restraint device or used not only for the restraint device but also for other control device for controlling a running system and/or an electric system. This arrangement allows the occupant restraining mode by the restraint device to be variable according to the information about the vehicle occupant having high reliability, thereby achieving thorough restraint of the vehicle occupant.

The ninth form of the present invention for achieving the aforementioned object is a vehicle described hereafter.

The vehicle in this form is a vehicle comprising at least a running system including an engine, an electrical system, a drive control device, a vehicle seat, a camera, and a processing device.

The running system including an engine is a system relating to driving of the vehicle by the engine. The electrical system is a system relating to electrical parts used in the vehicle. The drive control device is a device having a function of conducting the drive control of the running system and the electrical system. The camera has a function of obtaining an image relating to a single view point toward the vehicle seat. The processing device is a device having a function of processing information from the camera by the drive control device. In this form, the processing device comprises an occupant information detection system as in any of the earlier described forms. The information about the vehicle occupant which is detected by the occupant information detection system is properly processed by the processing device and is used for various controls relating to the vehicle including the occupant restraint device which operates for protecting the vehicle occupant.

According to this arrangement, a vehicle in which the information about the vehicle occupant which is precisely detected by the occupant information detection system is used for various controls relating to the vehicle can be obtained.

As described above, the present invention has an arrangement of associating occupant surface profile information relating to a specific body region of a vehicle occupant, which is obtained by a camera particularly for obtaining an image relating to a single view point, with previously stored body information so as to derive the position of the specific body region, thereby enabling the precise detection of the information about the vehicle occupant in a vehicle seat.

DETAILED DESCRIPTION OF THE PREFERRED EMBODIMENTS

Hereinafter, embodiments of the present invention will be described in detail with reference to drawings. First, description will be made as regard to an occupant restraint system 100 as an embodiment of the "occupant restraint system" according to the present invention with reference to FIG. 1 and FIG. 2.

Figure 1:
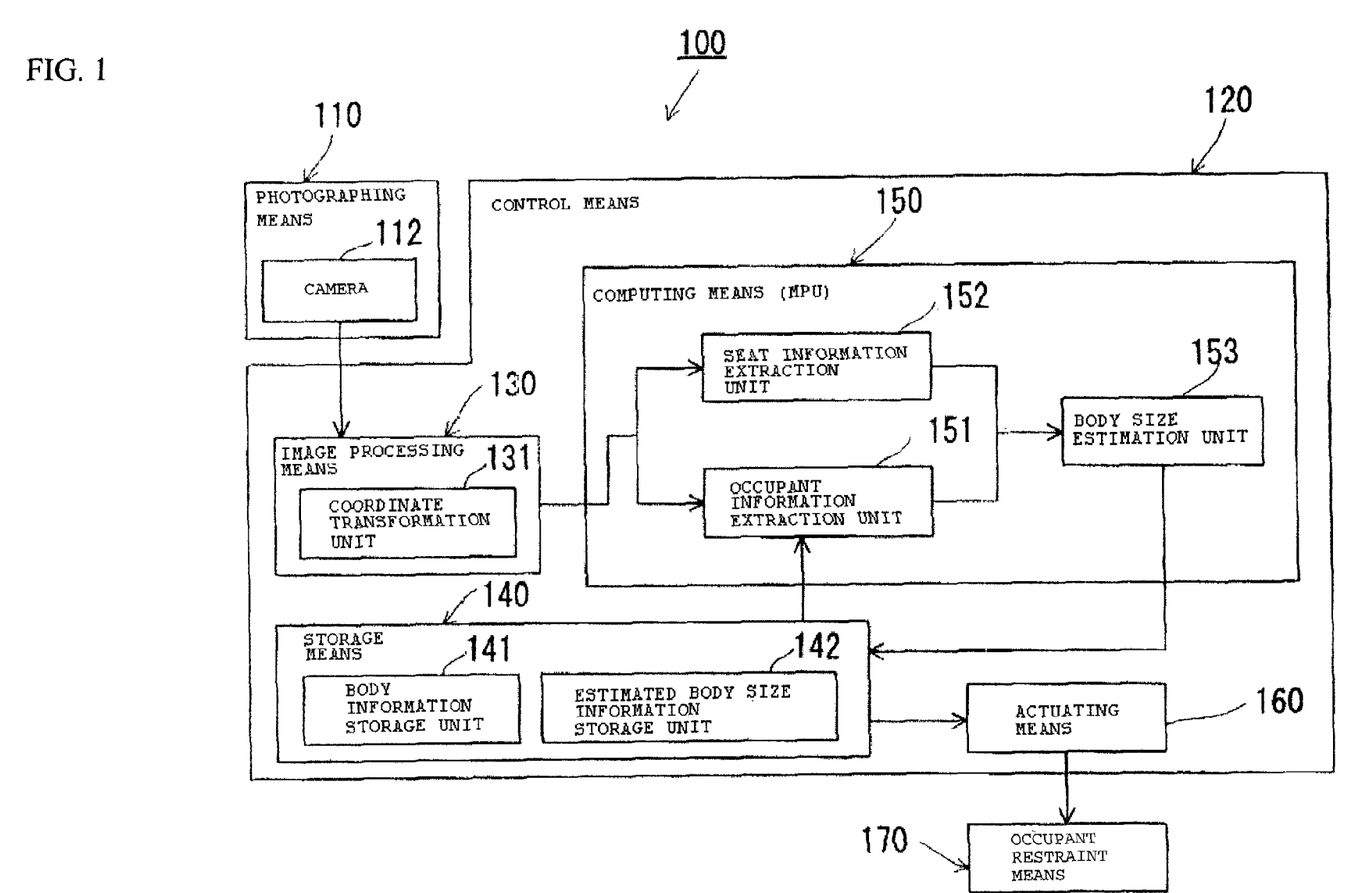
FIG. 1 is an illustration showing the arrangement of an occupant restraint system 100, which is installed in a vehicle, according to an embodiment.

The arrangement of the occupant restraint system 100 to be installed in a vehicle according to this embodiment is shown in FIG. 1.

As shown in FIG. 1, the occupant restraint system 100 of this embodiment is installed for restraining an occupant in a driver seat in an automobile which corresponds to the "vehicle" of the present invention. The occupant restraint system 100 mainly comprises a photographing device 110, a control device 120, and an occupant restraint device 170. The vehicle comprises a running system including an engine and other parts for driving the vehicle, an electrical system for electrical parts used in the vehicle, and a drive control device for conducting the drive control of the running system and the electrical system. The drive control device may be the control device 120 (corresponding to "control device" and "processing device" of the present invention) of the occupant restraint system 100 or an exclusive control device for the running system and the electrical system.

The photographing device 110 comprises a 3D (three-dimensional) camera 112 of a C-MOS or CCD (charge-coupled device) type in which light sensors are arranged into an array (lattice) arrangement. The camera 112 may be a monocular C-MOS 3D camera or a pantoscopic stereo 3D camera. The camera 112 is installed to be built in an instrument panel, an A-pillar, or the periphery of a windshield in a front portion of a vehicle and is disposed to face in a direction capable of photographing one or more occupants.

Figure 2:
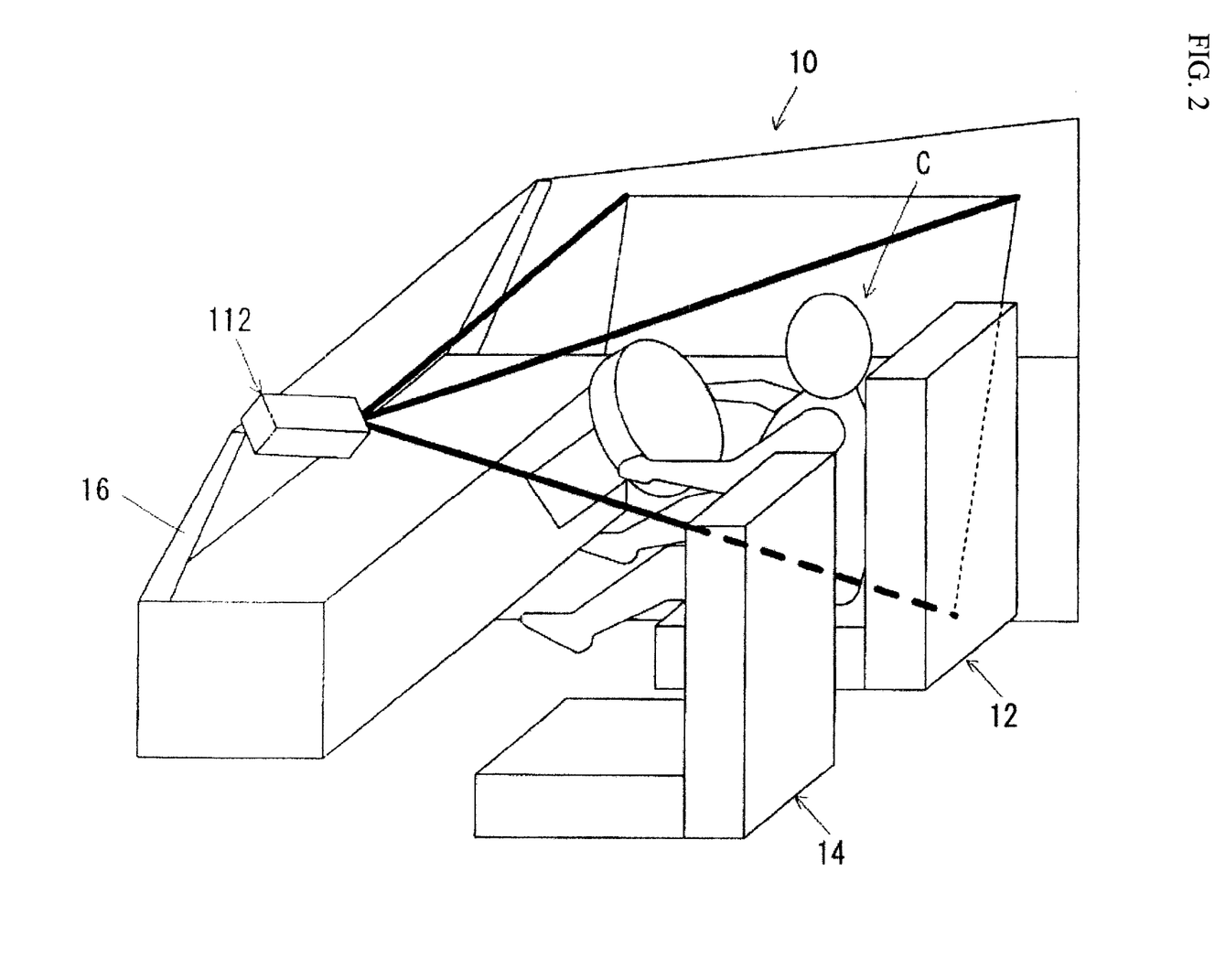
FIG. 2 is a perspective view showing a vehicle cabin taken from a camera 112 side.

A perspective view of the cabin of the vehicle 10 taken from the camera 112 side is shown in FIG. 2 as a specific example of the installation of the camera 112 in a cabin of a vehicle 10. As shown in FIG. 2, the camera 112 is disposed at an upper portion of an A-pillar 16 on the side of the passenger seat 14 to face in a direction capable of photographing an occupant C (sometimes called "seated occupant" or "driver") on a driver seat 12, as the "vehicle seat" of the present invention, with focusing the camera on the occupant C. Information about the vehicle occupant C and the objects around the vehicle occupant C is detected a plurality of times periodically by using the camera 112. The camera 112 corresponds to "a camera for obtaining an image relating to a single view point directing to the vehicle occupant" of the present invention.

The control device 120 comprises at least an image processing device 130, a storage device 140, a computing device (MPU: micro processing unit) 150, an actuating device 160, an input/output device, a peripheral device, and the like, but the input/output device and the peripheral device are not shown.

The image processing device 130 is a device for processing images taken by the camera 112. Based on distance information and position information about the photographed object, the image processing device 130 clips a three-dimensional object within a specific region of the image range and divides the object into a combination of vehicle occupant and a vehicle seat and vehicle parts other than the combination. Also in this embodiment, the image processing device 130 comprises a coordinate transformation unit 131. The coordinate transformation unit 131 is adapted to transform the coordinate system about the camera 112 into a coordinate system about the vehicle body. Specifically, the coordinate transformation unit 131 transforms a view of the vehicle occupant C taken from the camera 112 into a view of the vehicle occupant C taken from the left side of the vehicle body. Further, the image processing device 130 is adapted to roughly recognize features of the three-dimensional object or roughly categorize the position and size of the vehicle occupant C into groups based on the volume distribution of the three-dimensional object.

The storage device 140 is a device for storing (recording) various data and the computed results to be used in the control device 120 and, in this embodiment, comprises at least a body information storage unit 141 and an estimated body size information storage unit 142. The storage device 140 corresponds to "a storage device for previously storing body information about surface profiles of a human body" of the present invention.

The body information storage unit 141 is adapted to previously store the body information (data of body features) such as profiles (contours) and sizes of respective body regions (for example, head, face, neck, jaw, shoulder, arm, leg, and knee) of a person and the positional relations among the body regions. The estimated body size information storage unit 142 is adapted to temporally record (store) information as a result of estimation by a body size estimation unit 153 as will be later described. The information as a result of estimation by the body size estimation unit 153 is read out from the estimated body size information storage unit 142 and is suitably used for controlling the occupant restraint device 170 based on the information.

The computing device 150 comprises at least an occupant information extracting unit 151, a seat information extracting unit 152, and the body size estimation unit 153. The computing device 150 corresponds to "a deriving device" of the present invention.

The occupant information extracting unit 151 is adapted to extract various information relating to the vehicle occupant C based on the information processed by the image processing device 130. Specifically, the positions, distances, profiles (contours) of respective body regions (for example, head, face, neck, jaw, shoulder, arm, leg, and knee) of the vehicle occupant C, the positional relations among the body regions, and the like are extracted by the occupant information extracting unit 151. The occupant information extracting unit 151 corresponds to "an information extraction device" of the present invention.

The seat information extracting unit 152 is adapted to extract various information relating to the driver seat 12 based on the information processed by the image processing device 130. Specifically, the positions, distances, angles, profiles (contours), and the like of the driver seat 12 and its components (such as a seat back, a seat cushion, a headrest and the like) are extracted by the seat information extracting unit 152.

The body size estimation unit 153 is adapted to estimate the body size of the vehicle occupant C based on the information extracted by the occupant information extracting unit 151 and the information extracted by the seat information extracting unit 152. Specifically, the indexes relating to the body size such as the sitting height, the chest thickness, the shoulder width and the like of the vehicle occupant C are estimated by the body size estimation unit 153. When there is no information extracted by the occupant information extracting unit 151, the body size estimation unit 153 determines that "the seat is not occupied".

The actuating device 160 outputs an actuation signal (output signal) to the occupant restraint device 170 as a subject to be actuated (subject to be operated) and can vary the actuation signal to be outputted based on the estimated body size information by the body size estimation unit 153. Therefore, the mode for restraining the vehicle occupant C by the occupant restraint device 170 when operated is variable according to the estimated body size information. Accordingly, the actuating device 160 functions as a substantial control device relative to the occupant restraint device 170.

The occupant restraint device 170 is composed of one or more of occupant restraint devices such as an airbag apparatus (airbag module) and a seat belt apparatus which operate for restraining the vehicle occupant in the event of a vehicle accident. The occupant restraint device 170 corresponds to "an occupant restraint device" of the present invention. In addition to the occupant restraint device 170, a warning device (indication output, audio output) and the like may be installed.

In addition, an input element is installed in the vehicle 10 to detect information about collision prediction or collision occurrence of the vehicle, information about the driving state of the vehicle, information about traffic conditions around the vehicle, information about weather condition and about time zone, and the like and to input such detected information to the control device 120, but not shown.

Hereinafter, the action of the occupant restraint system 100 having the aforementioned arrangement will be described with reference to FIG. 3 through FIG. 7 in addition to FIG. 1 and FIG. 2.

Figure 3:
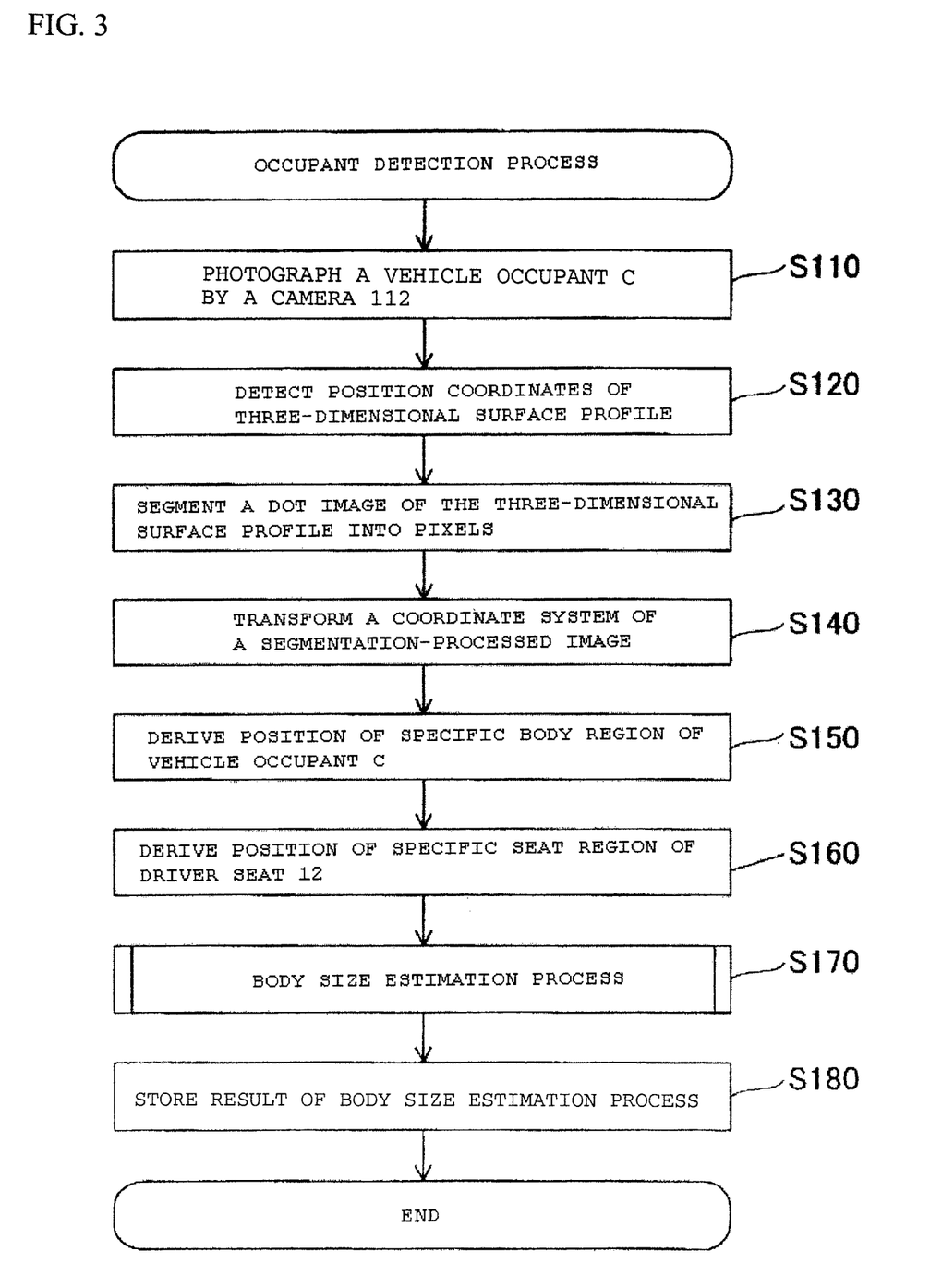
FIG. 3 is a flow chart of "occupant detection process" in the occupant restraint system 100.

FIG. 3 is a flow chart of "occupant detection process" in the occupant restraint system 100 of this embodiment. In this embodiment, the "occupant detection process" is carried out by the photographing device 110 (the camera 112) and the control device 120 as shown in FIG. 1. The "occupant information detection system" of the present invention comprises the photographing device 110 and the control device 120 for detecting information about the vehicle occupant C on the driver seat 12.

In step S110 shown in FIG. 3, an image is taken by the camera 112 in a state that the camera 112 is generally focused on the vehicle occupant (the vehicle occupant C as shown in FIG. 2) in the driver seat. Therefore, the vehicle occupant, the driver seat, and the peripheral portions thereof are photographed by the camera 112 and are taken as lattice-point information (for example, information of thousands or several tens of thousands of lattice points) including information about distance from the camera 112 and the positional information. The camera 112 is a camera capable of detecting a three-dimensional surface profile of the vehicle occupant C from a single view point and corresponds to the "camera" of the present invention.

The camera 112 is set to be actuated, for example, when an ignition key is turned on or when a seat sensor (not shown) installed in the driver seat 12 detects a vehicle occupant C seated in the driver seat 12.

Then in step S120 shown in FIG. 3, based on the information taken by the camera 112, a three-dimensional object within a specific region of the image range is clipped, the object is divided into a combination of vehicle occupant C and a vehicle seat 12 and vehicle parts other than the combination, and the positional coordinate of the three-dimensional profile of the vehicle occupant C and the driver seat 12 is detected.

Figure 4:
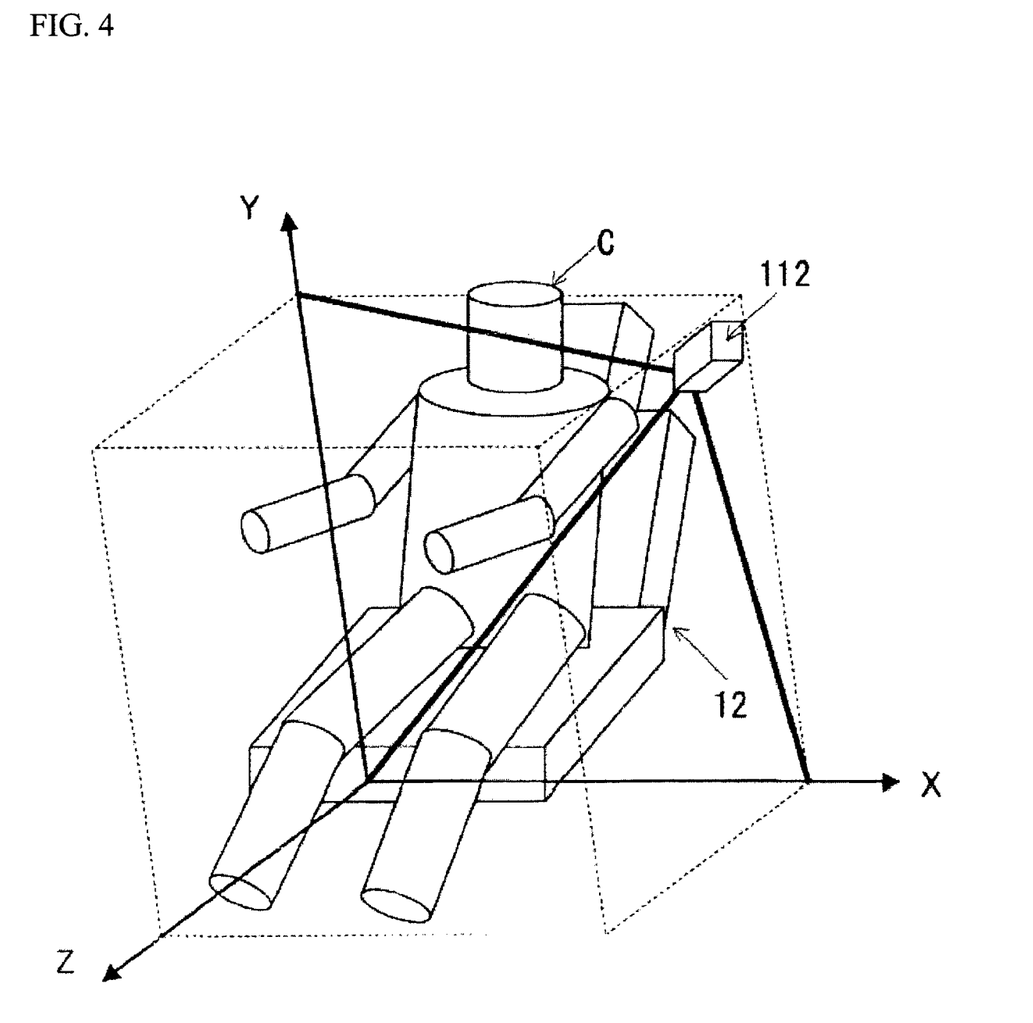
FIG. 4 is an illustration showing an aspect of pixel segmentation in the embodiment.

In step S130, a segmentation process is conducted to segment a dot image of the three-dimensional profile obtained in the step S120 into a large number of pixels. In the segmentation process, the dot image of the three-dimensional surface profile is segmented into three-dimensional lattices, for example, (X64)×(Y64)×(Z32). An aspect of pixel segmentation in this embodiment is shown in FIG. 4. As shown in FIG. 4, the center of a plane to be photographed by the camera is set as an origin, an X axis is set as lateral, a Y axis is set as vertical, and a Z axis is set as anteroposterior. With respect to the dot image of the three-dimensional profile, a certain range of the X axis and a certain range of the Y axis are segmented into respective 64 pixels, and a certain range of the Z axis is segmented into 32 pixels. It should be noted that, if a plurality of dots are superposed on the same pixel, an average is employed. According to the process, a segmentation-processed image of the three-dimensional profile is obtained. The segmentation-processed image corresponds to a perspective view of the vehicle occupant C taken from the camera 112 and shows a coordinate system about the camera 112.

Figure 5:
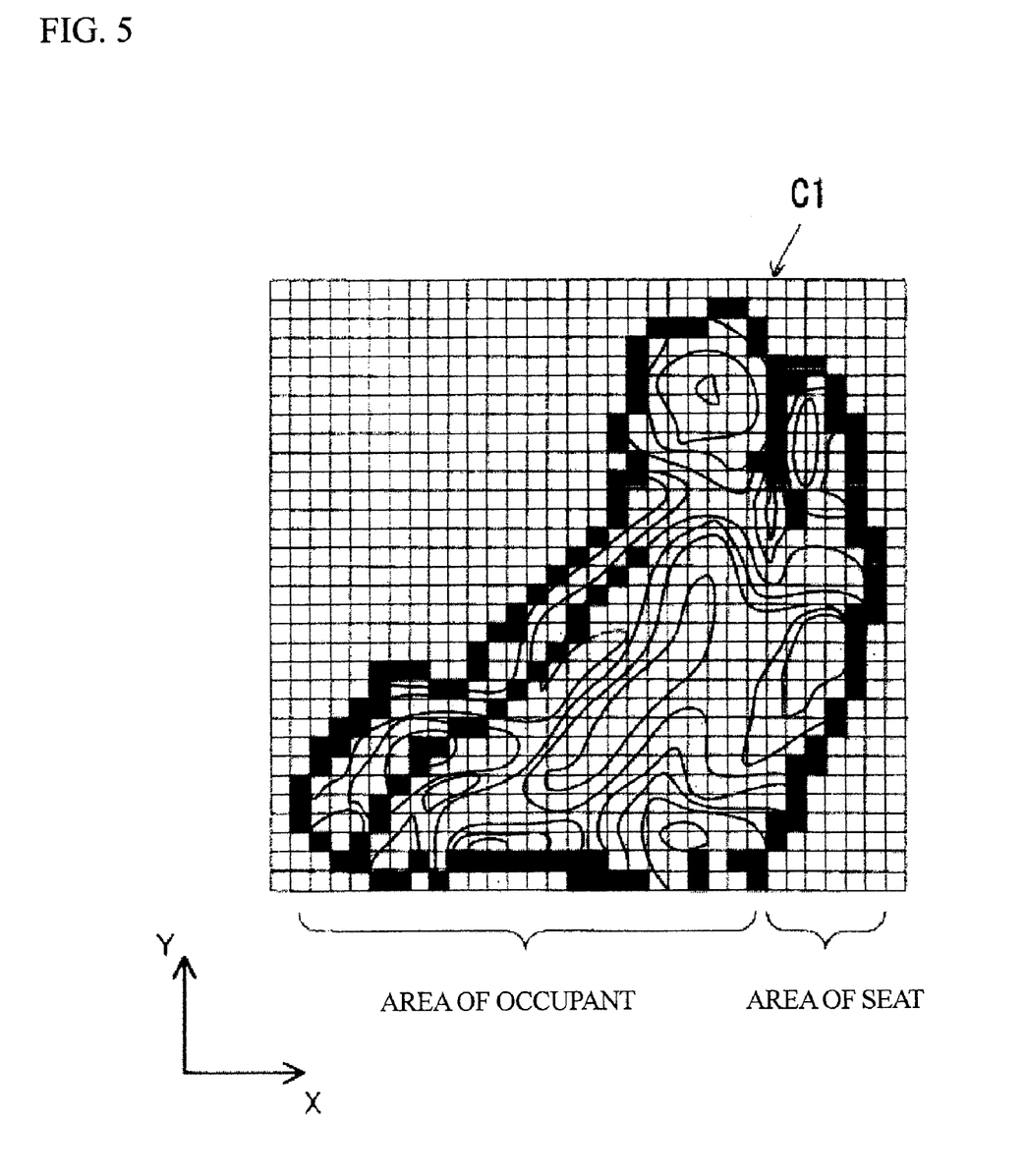
FIG. 5 is an illustration showing a processed image C1 including an occupant portion corresponding to a vehicle occupant C and a seat portion corresponding to a driver seat 12.

In step S140, a coordinate transformation process of the segmentation-processed image obtained in the step S130 is conducted. In the coordinate transformation process, the segmentation-processed image as the coordinate system about the camera 112 is transformed into a coordinate system about the vehicle body. Specifically, the image of the vehicle occupant C from a viewpoint of the camera 112 is transformed into an image of the vehicle occupant C from a viewpoint of a left side of the vehicle body. That is, in transformation, the X axis is set to extend in the front-to-rear direction of the vehicle, the Y axis is set to extend in the upward direction of the vehicle, and the Z axis is set to extend in the left-to-right direction of the vehicle. Accordingly, for example, the segmentation-processed image is transformed into a transformation-processed image C1 as shown in FIG. 5 including an occupant section corresponding to the vehicle occupant C and a seat section corresponding to the driver seat 12.

These processes in step S110 through step S140 are carried out by the image processing device 130 shown in FIG. 1. The respective processes in step S110 through step S140 may be carried by respective separate processing device.

Figure 6:
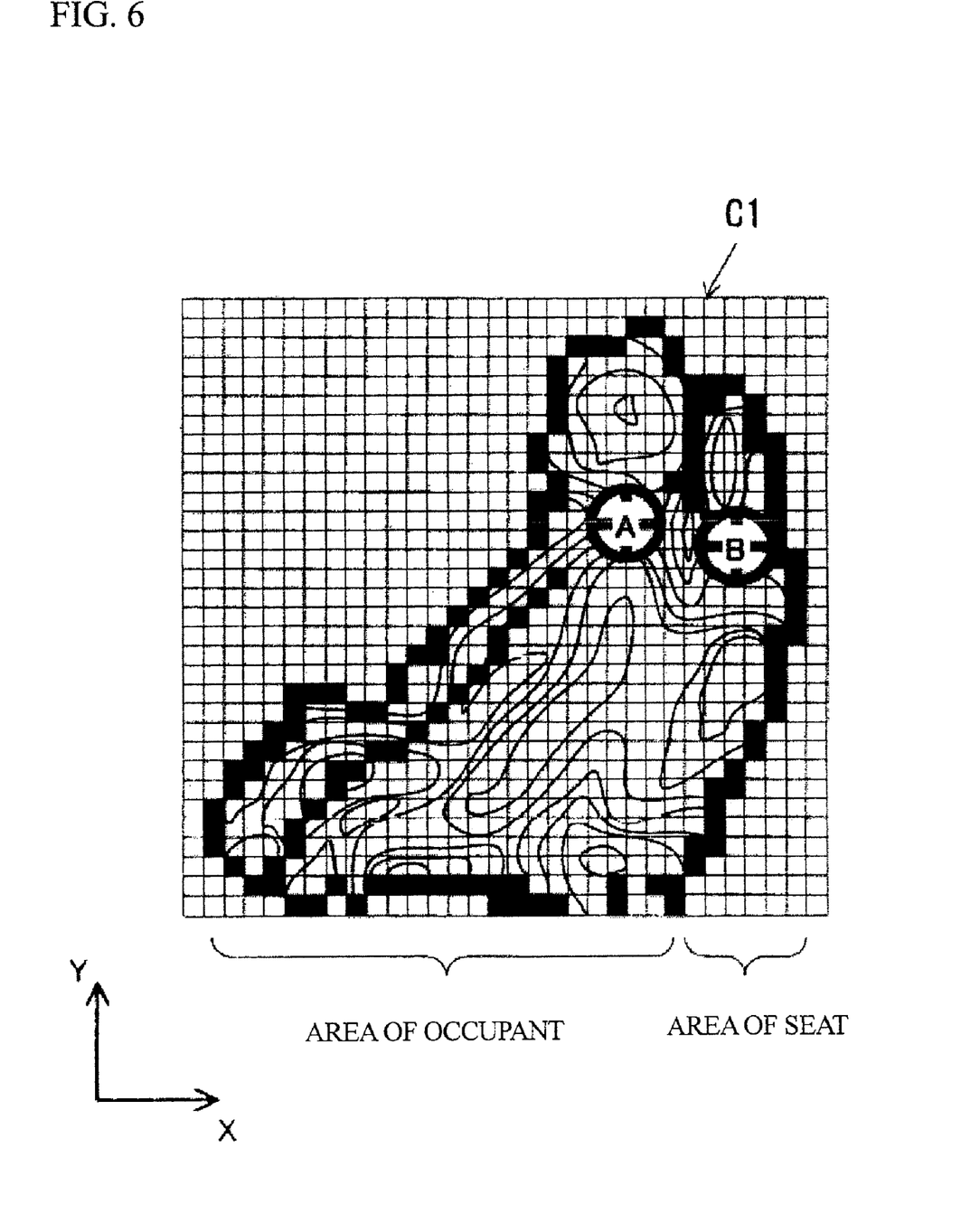
FIG. 6 is an illustration showing the processed image C1 as shown in FIG. 5, wherein a neck region is indicated as a region A and an upper portion of the seat back is indicated as a region B.

Then, in step S150, a process for deriving the position of specific body region of the vehicle occupant C is conducted. This process is carried out by the occupant information extracting unit 151 shown in FIG. 1. Specifically, as a neck region (contour around the neck) of the vehicle occupant C is defined as the specific body region ("specific body region" of the present invention), the process selects a region corresponding to the neck region from the occupant profile obtained by the camera 112. In this case, this process uses body information (body feature data) previously stored in the body information storage unit 141 shown in FIG. 1. That is, a region having contour similar to the contour of the neck region which are previously stored in the body information storage unit 141 are selected as the neck region. Therefore, for example, a portion A of the processed image C1 shown in FIG. 6 is specified as the neck region.

This process corresponds to "associating occupant surface profile information relating to the specific body region of said vehicle occupant in the information extracted by said information extraction device with said body information which is previously stored in said storage device" of one form or the "compares the surface profile information of said specific body region to the body surface profile information of respective body regions which are previously stored in said storage device and derives the position of said specific body region based on a result of the comparison" of another form.

In this embodiment, the neck region to be set as the specific body region has significant feature in surface profile. Further, its contour is hardly influenced by the slight shifting of the photographing direction of the camera 112 and its level is hardly changed relative to the movement of the vehicle occupant C. In addition, since the neck region is exposed from clothes or the like, the neck region is hardly influenced by the thickness of the clothes when it is required to detect the actual body size of the vehicle occupant. Therefore, among regions of the body, the neck region is a region especially effective to estimate the body size of the vehicle occupant C precisely. It should be noted that one or more of regions such as head, face, jaw, shoulders, arms, legs, knees, and the like other than the neck region set in this embodiment may be used in the present invention.

In the aforementioned process of the step S150, the feature such as the contour of the specific body region which is previously stored in the body information storage unit 141 may be similar to the features of a plurality of regions of the processed image C1, depending on the size and the configuration of the specific body region. In this case, it is difficult to identify the specific body region. Therefore, for this case, it is effective to make a comparison relating to the positional relation between the specific body region and its peripheral regions, in addition to a comparison relating to the configuration of the specific body region. Specifically, in addition of the feature of the contour of the neck region, a condition that the neck is near the shoulders and the jaw is also employed. With this condition, the process compares the body information, which is previously stored in the body information storage unit 141, to the processed image C1, thereby precisely refining the candidate regions.

This process corresponds to "associating occupant surface profile information relating to the specific body region of said vehicle occupant in the information extracted by said information extraction device with said body information which is previously stored in said storage device" of one form or "compares the positional relation between the specific body region and a region around the specific body region to the positional relation between body regions which are previously stored in the storage device in addition to comparing the surface profile information of the specific body region to the body surface profile information of respective body regions which are previously stored in the storage device, and derives the position of the specific body region based on a result of the comparison" of another form.

For comparing the body information, which is previously stored in the body information storage unit 141, with the processed image C1, the specific body region may be previously set or selected from body regions taking the photographing quality of the camera 112 into consideration. For example, the degree of quality or the degree of similarity of image information may be employed as criterion for determination ("criterion for determination" of the present invention). Accordingly, among a plurality of body regions, only a region having high quality image information (region having high reliability as image information) or a region of which occupant information actually obtained by the camera 112 has high similarity to the body information previously stored in the body information storage unit 141 can be set as the specific body region. Therefore, it is possible to screen out image information of which quality is decreased due to irregular posture and movement of the vehicle occupant C or abnormal optical reflection.

In step S160 following the aforementioned step S150, a process for deriving the position of specific seat region (vehicle-side reference region) of the driver seat 12 is conducted. This process is carried out by the seat information extracting unit 152 shown in FIG. 1. Specifically, an upper portion of the seat back (generally a region between the seat back and the head rest) of the driver seat 12 is specified as the specific seat region. The upper portion of the seat back to be set as the specific seat region has features in its surface profile so that the position of the upper portion is presumed from the three-dimensional figure of the seat. Therefore, for example, a portion B of the processed image C1 shown in FIG. 6 is specified as the upper portion of the seat back. Since the driver seat 12 to be set as the vehicle-side reference region is a region closely relating to the position and movement of the vehicle occupant C among respective vehicle-side regions, information about the vehicle occupant C can be detected more precisely by setting the driver seat 12 as the vehicle-side reference region. Among the respective regions of the driver seat 12, the upper portion of the seat back is a region having features in surface profile so as to allow easy identification of the position of the vehicle-side reference region.

When a seat slide position detection sensor, a seat cushion height detection sensor, a seat back angle detection sensor, and the like are installed, the position of the upper portion of the seat back can be presumed from information such as the seat slide position, the seat cushion height, the seat back angle, and the like obtained from these sensors.

In step S170, body size estimation process of the vehicle occupant C is conducted by using the position of the specific body region derived in step S150 and the position of the specific seat region derived in step S160. This process is conducted by the body size estimation unit 153 shown in FIG. 1.

Specifically, the seating height of the vehicle occupant C is estimated by obtaining the relative height of the neck region as the specific body region relative to the upper portion of the seat back as the specific seat region. When the position of the upper portion of the seat back is not derived, the position of the upper portion of the seat back can be assumed as being positioned at a preset reference position.

Relating to the body size estimation process in the step S170, the chest thickness, the shoulder width, the configuration of the upper torso (volume, peripheral length), and the like other than the seating height of the vehicle occupant C may be estimated.

For example, for estimating the chest thickness of the vehicle occupant C, the positions of the shoulder and chest are derived as the specific body regions in step S150 and the position of the upper portion of the seat back is derived as the specific seat region in step S160. From the positional relation in anteroposterior direction between the shoulder and the upper portion of the seat back, it is detected whether or not the back of the vehicle occupant C is in close contact with the seat back. Then, from differential distance between the position of the chest and the position of the seat back, the chest thickness is estimated.

By performing the aforementioned processes in step S110 through step S170 sequentially, the body size of the vehicle occupant C detected by the camera 112 can be estimated. Information as result obtained by the body size estimation process in step S170 is used for controlling an object of actuation such as the occupant restraint device 170 or is temporally stored in the estimated body size storage unit 142 of FIG. 1 in step S180 shown in FIG. 3 so that the information is read out when necessary such as for controlling the object of actuation such as the occupant restraint device 170.

Figure 7:
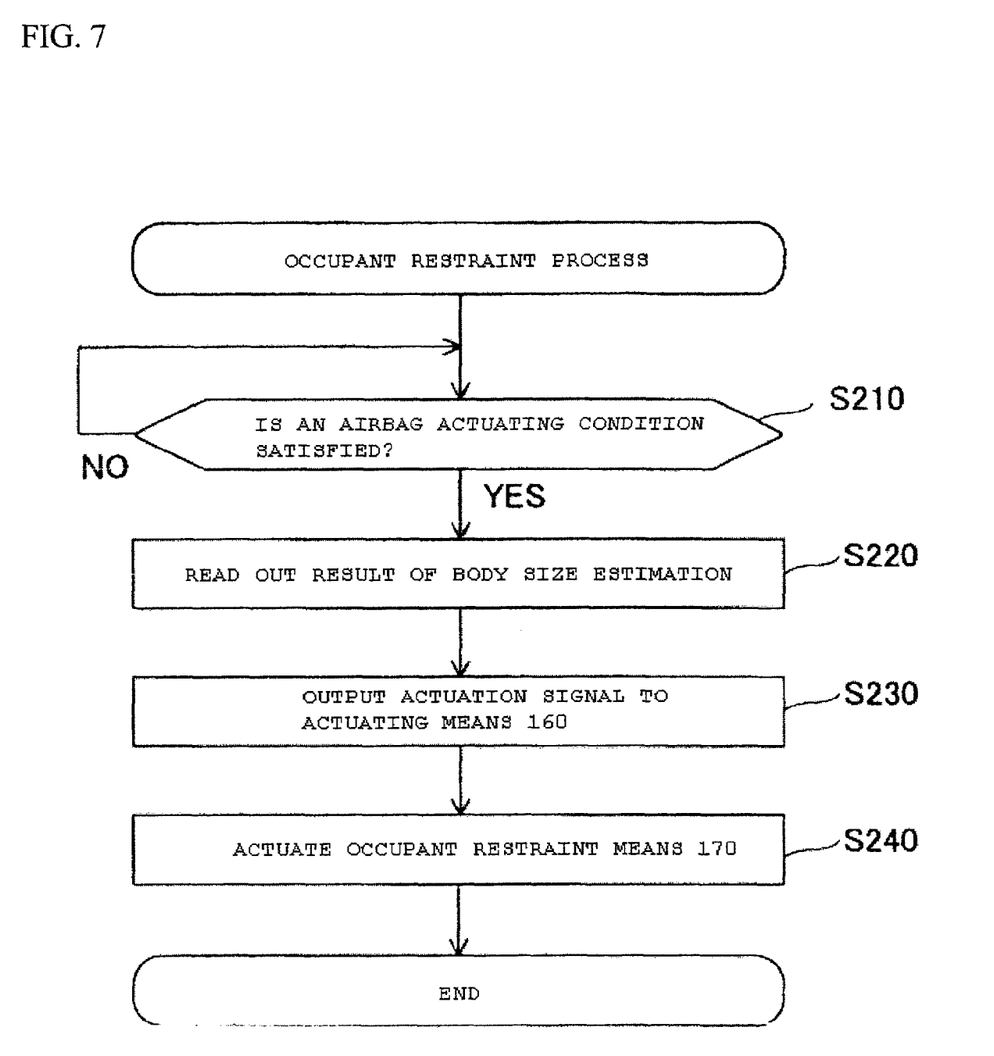
FIG. 7 is a flow chart of "occupant restraint process" in the occupant restraint system 100 of the embodiment.

FIG. 7 is a flow chart of "occupant restraint process" in the occupant restraint system 100 of this embodiment. In this embodiment, the "occupant restraint process" is conducted by the photographing device 110 (camera 112), the control device 120, and the occupant restraint device 170 shown in FIG. 1. The photographing device 110, the control device 120, and the occupant restraint device 170 compose the "occupant restraint system" of the present invention.

In step S210 shown in FIG. 7, it is determined whether or not an airbag actuating condition is satisfied. Specifically, when danger of collision occurrence of the vehicle 10 is predicted or occurrence of actual collision is detected by a proximity sensor or a contact sensor, it is determined that the airbag actuating condition is satisfied.

When it is determined that the airbag actuating condition is satisfied (YES in step S210), the process proceeds to step S220 where information temporally stored in the estimated body size information storage unit 142 shown in FIG. 1 is read out. In step S230, an actuation signal is outputted to the actuating device 160 shown in FIG. 1 according to the information read out in step S220, whereby the occupant restraint device 170 is actuated (step S240). In this embodiment, the signal outputted to the actuating device 160 or the occupant restraint device 170 is variable depending on the information obtained by the body size estimation process in step S170 shown in FIG. 3, that is, the information about the body size of the vehicle occupant C. Accordingly, the restraint capability (occupant restraining mode) by the occupant restraint device 170 is varied according to the body size of the vehicle occupant.

As an example, in case where the occupant restraint device 170 is an airbag module comprising an inflator (gas generator) and an airbag, the inflator is actuated in the event of a vehicle collision based on an actuation signal from the actuating device 160 so as to supply gas for deployment to the airbag. The pressure and flow volume of gas supplied from the inflator to the airbag are variable according to the information about the body size of the vehicle occupant C. Accordingly, the restraint capability (occupant restraining mode) by the airbag which is deployed into a region for occupant restraint is varied according to the body size of the vehicle occupant.

As mentioned above, the vehicle restraint system 100 of this embodiment can detect information about the vehicle occupant C precisely by performing the "occupant detection process" shown in FIG. 3. In addition, by performing the "occupant restraint process" shown in FIG. 7, the occupant restraining mode by the occupant restraint device 170 can be controlled according to the reliable information about the vehicle occupant C, thereby achieving thorough restraint of the vehicle occupant C.

Further, this embodiment provides a vehicle 10 provided with an occupant restraint system 100 which is effective for achieving thorough restraint of a vehicle occupant.

The present invention is not limited to the aforementioned embodiments and various applications and modifications may be made. For example, the following respective embodiments based on the aforementioned embodiments may be carried out.

In the present invention, the operating mode of another occupant restraint device other than the airbag module, for example, the winding/unwinding mode of a seat belt and the operating mode of a warning device (indication output, audio output), may be controlled to be varied according to the "occupant detection process" of the aforementioned embodiment shown in FIG. 3.

Besides the aforementioned structure of controlling the operating mode of the occupant restraint device 170 according to the body size information of the vehicle occupant C as the "occupant restraint process" of the aforementioned embodiment shown in FIG. 7, the present invention can employ a structure of controlling the operating mode of the occupant restraint device 170 according to the position of a body region of the vehicle occupant C and/or the positional relation (positional relation in the vehicle vertical direction, positional relation in the vehicle anteroposterior direction) and the like between the body region and the vehicle-side reference region (vehicle seat, interior panel, door, ceiling panel, steering wheel, or the like). Specifically, the operating mode of the occupant restraint device 170 is variable according to the position of the face, the position of the chest, or the position of the neck and shoulder of the vehicle occupant C and/or the relative position in the vertical direction and the relative distance in the anteroposterior direction between the position of the specific body region and the position of the vehicle-side reference region.

Though the aforementioned embodiment has been described with regard to a case where the neck region is set as the specific body region, another region (such as head, face jaw, shoulder, arm, leg, knee and the like) other than the neck region may be set as the specific body region or a plurality of regions including the neck region or a wide-range area from the head to the shoulders may be set as the specific body region in the present invention.

Though the aforementioned embodiment has been described with regard to the occupant restraint system 100 to be installed for a vehicle occupant in the driver seat, the arrangement of the occupant restraint system of the present invention may be adapted to be installed not only for a vehicle occupant in a driver seat but also for a vehicle occupant in a front passenger seat and a vehicle occupant in a rear seat. In this case, the camera as the photographing device may be suitably installed in various vehicle body components such as an instrument panel positioned in an anterior portion of an automobile body, a pillar, a door, a windshield, a seat and the like, according to need.

Though the aforementioned embodiment has been described with regard to a case for deriving information about the vehicle occupant C directly seated in the driver seat 12, the present invention can be used for an arrangement for deriving information about a vehicle occupant seated in a vehicle seat indirectly via a child seat or a junior seat.

Though the aforementioned embodiment has been described with regard to the arrangement of the occupant restraint system to be installed in an automobile, the present invention can be adopted to various vehicles other than automobile such as an airplane, a boat, a train, a bus, a truck, and the like.

What is claimed is:

1. In combination, a vehicle and a detection apparatus for detecting information about a vehicle occupant, the detection apparatus comprising:
    a cabin of the vehicle having a seat for the vehicle occupant;
    a detection device mounted in the cabin for obtaining an image of the vehicle occupant and the vehicle seat on which the occupant is to be seated;
    a storage device for storing information relating to potential vehicle occupants seated on the vehicle seat;
    a controller configured to derive positional information from the obtained image of a predetermined one of a plurality of body regions of the vehicle occupant by comparing the obtained image with the stored information relating to the potential vehicle occupants, the controller further being configured to derive positional information from the obtained image of a predetermined reference region of the vehicle seat; and
    a body size estimation unit of the controller that is configured to derive body size information of the vehicle occupant including at least one of sitting height, chest thickness, and shoulder width of the vehicle occupant based on the derived positional information of the one body region and the derived positional information of the predetermined reference region of the vehicle seat.

2. The detection apparatus of claim 1, wherein, the stored information relating to potential vehicle occupants includes positional relations of body regions of human bodies, and the controller is configured to derive the positional information of the body region by comparing a positional relation between adjacent body regions in the obtained image to the positional relation of stored body regions.

3. The detection apparatus of claim 1, wherein the predetermined one of the body regions is a neck region.

4. The detection apparatus of claim 1, wherein the controller includes a seat information extraction unit that determines positioning of the vehicle seat reference region from the obtained image.

5. The detection apparatus of claim 1, in combination with an occupant protection device, and the controller is operable to selectively actuate the occupant protection device based on the vehicle occupant's body size information.

6. The detection apparatus of claim 1, wherein the controller is configured to determine the positional information relating to the vehicle occupant by requiring a predetermined degree of accuracy of association between the obtained image and the stored information relating to the potential vehicle occupant.

7. A method of determining information regarding a vehicle occupant, the method comprising:
    storing information regarding configurations of individual body regions including neck and adjacent shoulder and jaw regions and positional relations between individual ones of the body regions and body regions adjacent thereto of potential vehicle occupants;

obtaining an image of the vehicle occupant in the vehicle;

selecting a region of the vehicle occupant image determined as corresponding to only the neck region of the vehicle occupant based on an initial comparison of the selected image region with the stored neck region configurations;

subsequently comparing positional relations between the selected image region determined as corresponding to only the neck region and adjacent image regions with the stored information regarding the positional relations between the stored neck region configurations and the body regions adjacent thereto including the shoulder and jaw regions when the initial comparison results in multiple ones of the stored individual body regions as being a potential match for only the neck region so that the initial comparison generally is inconclusive and so that the subsequent comparison optimizes the accuracy of matching the selected image region to only the neck region; and deriving body size information regarding the vehicle occupant based on information relating to the selected image region corresponding to only the neck region via the initial comparison and, when the initial comparison is generally inconclusive, the subsequent comparison.

8. The method of claim 7, further comprising selectively controlling a restraint device at least partially dependent on the derived body size information regarding the vehicle occupant.

9. The method of claim 7, further comprising applying predetermined criteria relating to the accuracy of the obtained image of the vehicle occupant, or the similarity between the obtained image and the stored information, and the body size information regarding the vehicle occupant is further derived by screening out the unreliable image regions based on the predetermined criteria.

10. The method of claim 7, further comprising obtaining positional information regarding a vehicle reference region; and the body size information of the vehicle occupant is derived based on the information relating to the image region matched to the selected body region of the vehicle occupant and the positional information regarding the vehicle reference region.

11. The method of claim 10, wherein the vehicle reference region is a vehicle seat, and the positional information regarding the vehicle seat is obtained from a seat position detector.

12. The method of claim 10, further comprising selectively controlling a restraint device based on the estimated size of the vehicle occupant.

13. The method of claim 7, further comprising selectively controlling a vehicle system using the derived body size information regarding the vehicle occupant.

14. The method of claim 7, further comprising obtaining positional information regarding a vehicle seat;

the body size information of the vehicle occupant is derived based on the information relating to the image region matched to the selected body region of the vehicle occupant and the positional information regarding the vehicle seat; and selectively controlling a restraint device based on the estimated size of the vehicle occupant.

15. The method of claim 14, further comprising detecting an emergency condition of the vehicle, wherein the restraint device is further selectively controlled based on the detected emergency.

* * * * *